United States Patent [19]
Barnett et al.

[11] 3,743,069
[45] July 3, 1973

[54] GLASS FIBER FRICTION ELEMENT

[75] Inventors: Irvin Barnett, Martinsville; Walter B. Peters, South Orange, both of N.J.

[73] Assignee: Johns-Manville Corporation, New York, N.Y.

[22] Filed: June 24, 1971

[21] Appl. No.: 156,410

[52] U.S. Cl.............. 192/107 M, 156/173, 161/47, 188/218 XL, 161/DIG. 4
[51] Int. Cl............................................. F16d 13/60
[58] Field of Search ............................. 192/107 M; 188/251 A, 251 M, 218 XL; 156/173; 161/35, 47, 48, DIG. 4

[56] References Cited
UNITED STATES PATENTS

| | | | |
|---|---|---|---|
| 3,526,306 | 9/1970 | Bentz et al. | 192/107 M |
| 2,749,266 | 6/1956 | Eldred | 192/107 M |
| 2,724,671 | 11/1955 | Lombardy | 192/107 M |
| 3,118,527 | 1/1964 | Lombardy et al. | 192/107 M |
| 3,068,131 | 12/1962 | Morton | 192/107 M X |
| 3,600,258 | 8/1971 | Morton | 192/107 M |

FOREIGN PATENTS OR APPLICATIONS

| | | | |
|---|---|---|---|
| 854,005 | 1/1940 | France | 192/107 M |

*Primary Examiner*—Benjamin W. Wyche
*Attorney*—John A. McKinney, Robert M. Krone and Joseph J. Kelly et al.

[57] ABSTRACT

A friction material, such as a clutch facing, formed of continuous bundle of parallel continuous glass fibers spirally or randomly wound upon themselves in the form of an annular disc impregnated with heat curable cement and having brass wires helically disposed around the bundles.

18 Claims, 6 Drawing Figures

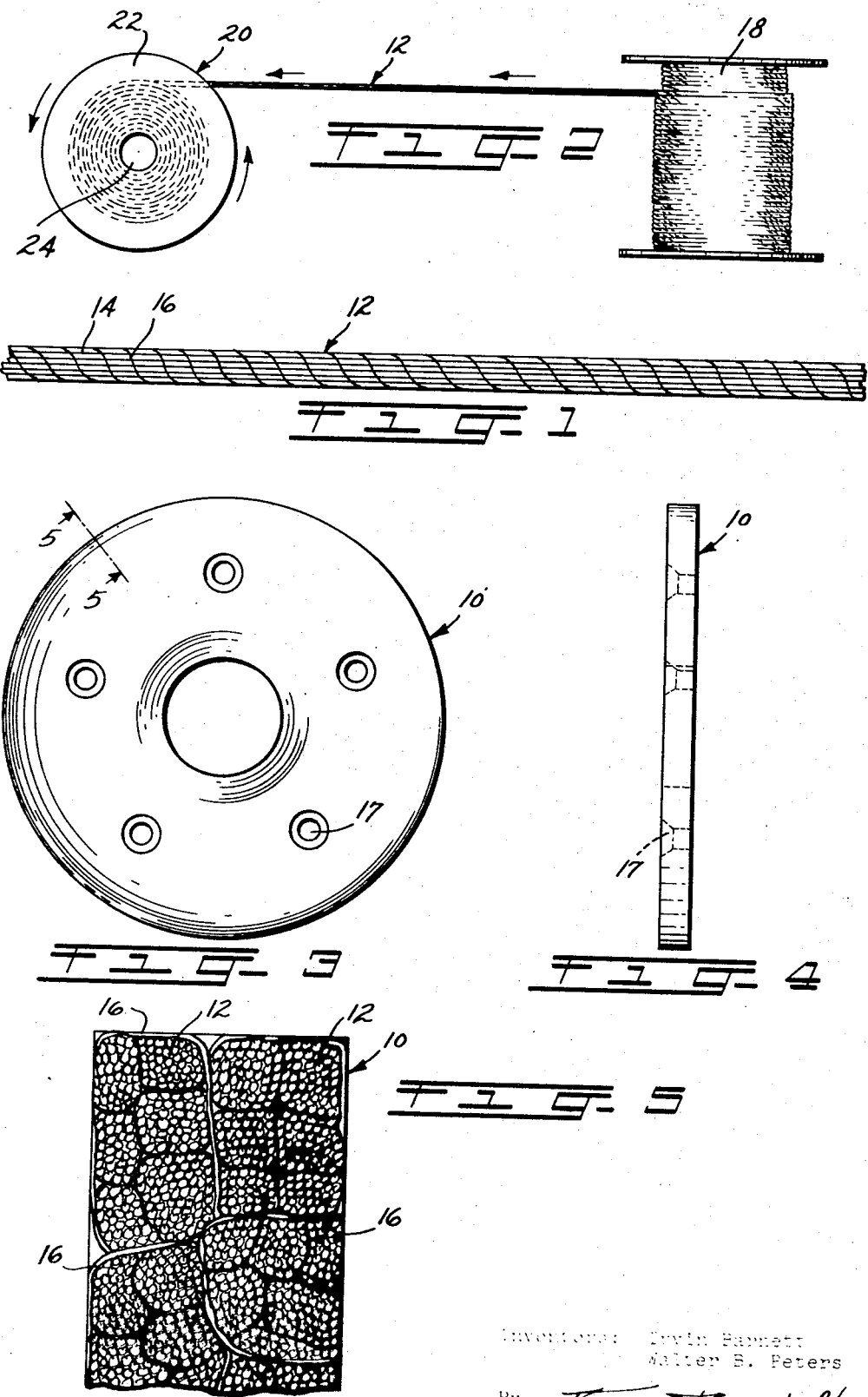

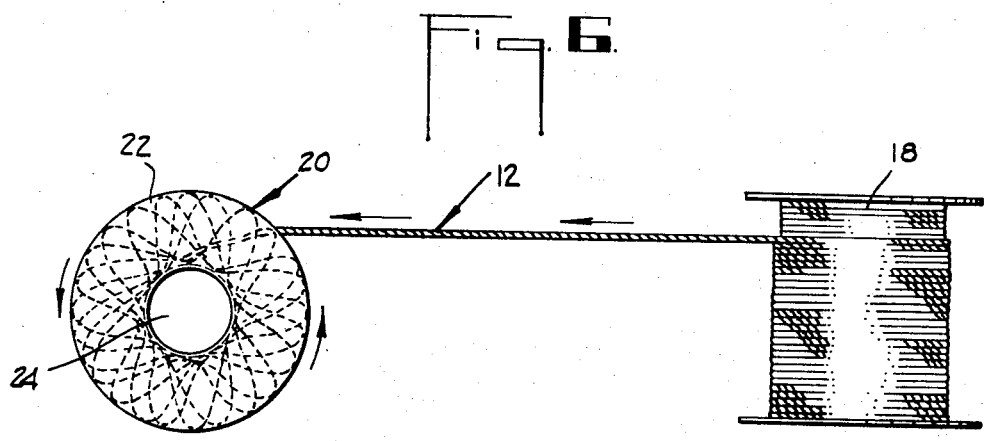

GLASS FIBER FRICTION ELEMENT

CROSS REFERENCE TO RELATED APPLICATIONS

This invention is concerned with a friction element formed by continuous bundle of continuous and parallel glass filaments. The bundle and the process of manufacture are disclosed in copending application Ser. No. 156,267 of Walter B. Peters and Irvin Barnett filed June 24, 1971, and also assigned to Johns-Manville Corporation.

BACKGROUND OF THE INVENTION

This invention relates to friction elements, particularly clutch facings, formed of continuous bundles of continuous glass fibers, helically wrapped by brass wires and impregnated with a heat curable cement and spirally or randomly wound upon themselves in the form of an annular disc.

The prior art contains many showings of asbestos fibers in clutch and friction material. Asbestos fibers contain many of the basic characteristics desirable for use in friction materials, for example:
1. Wetability for adhesion to binder matrix.
2. High tensile strength.
3. Good friction material because:
   a. Heat stable
   b. Hardness range generally below that of steel, therefore, will not wear metal friction facings.
   c. Desirable coefficient of friction,
   d. Fine fibrils on asbestos fibers that stabilize and reinforce the matrix.

Asbestos fibers combined with cotton fibers (or synthetic fibers) with appropriate cement have proven to be a good friction material for average service. Brass wires or metal particles have long been used in the friction material, primarily to dissipate heat. The formulas for clutch and brake materials including cements are numerous in varying combinations. As demands for greater spin strengths (resistance to centrifugal forces) increased, various arrangements have been proposed. These include metal backing plates to which the actual friction material is bonded. Backing plates have also been formed of laminated glass cloth with asbestos and other fibers and cement as the friction material. The glass fibers were present primarily for strength and not as the friction material.

As spin strength requirements became more demanding, glass fibers began to appear in the prior art. U.S. Pat. No. 3,270,846 (filed 1957) discloses use of up to 27 percent glass fibers in combination with other materials to form a friction facing for use in wet clutches which run in oil or other fluids. The specification does not clearly teach in what manner these fibers are incorporated with the other materials, which of course, include asbestos fibers. Prior thereto, U.S. Pat. No. 3,068,131 (filed 1958) had disclosed the use of plies of flat woven spun glass fabric in the reinforcing ring for supporting clutch facing material of asbestos fiber yarn and resin. U.S. Pat. No. 3,365,041 (filed 1965) discloses a reinforcing ring 11 of glass cloth and cement sandwiched between rings of friction elements 10 comprised of 75 percent asbestos fibers plus other material (not glass) and cement. Note that glass is for spin strength and other reinforcement while asbestos fibers and brass wires are for frictional engagement. U.S. Pat. No. 3,429,766 (filed 1965) discloses the use of a clutch facing of spirally wound multiply strips of asbestos fibers, metallic wire and cement reinforced by woven glass fabric By an inspection of FIG. 3, it is apparent that only one layer in five is glass cloth. The specification reveals that the glass fibers are for reinforcement, though it would appear that a few would likely be in friction contact. Again asbestos is by-and-large the friction fiber. In a later U.S. Pat. No. 3,526,306 (filed 1968) glass fibers 13 are used in the apex of the chevron for reinforcement and away from the wear surface.

The specification indicates that fabric 11 can be made of asbestos fibers alone or mixtures with other fibers such as cotton, wool, rayon, linen or jute. Fine metal wires 12 are used with fabric 11. Again asbestos fibers provides the main friction fiber.

The prior art has taught the use of asbestos fibers for frictional contact and glass fibers for strengthening the facing. Asbestos has been known to have the desirable characteristics as mentioned previously in this specification. It appears that the superiority of asbestos fibers in friction material has never been challenged even though, as the prior art clearly shows, it has been necessary to provide reinforcement of glass fibers.

Applicants' discovery is that glass fibers (with brass wire and cement) provide an improved friction surface with superior characteristics particularly in spin strength.

In the use of asbestos fibers for clutch facing material, it is conventional to twist relatively short (i.e., staple) asbestos fibers with nonferrous wire such as copper, brass or zinc together and impregnate the twisted strand with a friction cement. The wires primarily serve as a carrier for relatively short asbestos fibers during processing, though they provide some friction and define means for frictional heat transfer and dissipation when formed into a friction facing. The asbestos fibers generally fall within a random pattern intertwisted with the wire. The wires meander throughout the clutch facing, but follow a generally spiral path.

According to the present invention, continuous glass fibers which have been processed into continuous bundle are spirally or randomly wrapped upon themselves into disc-like form and cured under elevated heat and pressure. The cured form may then be machined and drilled to define a friction product, such as a clutch facing.

BRIEF SUMMARY OF THE INVENTION

It is an object of this invention to provide a friction material formed of continuous glass filaments and cement.

It is another object of this invention to provide a friction material such as a clutch facing comprised of parallel continuous glass filaments impregnated with cement and spirally or randomly wound upon themselves into a disc-like form and cured under elevated temperature and pressure.

It is a still further object of this invention to provide a continuous bundle of continuous and parallel glass filaments, impregnated by cement and helically wrapped by filament means, spirally or randomly wound upon itself into a disc-like form and cured under elevated temperature and pressure.

BRIEF DESCRIPTION OF THE DRAWINGS

The invention will be more fully understood and further objects and advantages thereof will become apparent when reference is made to the following detailed description of the preferred embodiment of the invention and the accompanying drawing in which:

FIG. 1 illustrates a short portion of a bundle of continuous and generally parallel glass filaments;

FIG. 2 represents a continuous bundle being drawn from a spool and spirally wound upon itself into disc-like form;

FIG. 3 is an elevation or face view of a friction member, such as a clutch facing in accordance with the invention;

FIG. 4 is a side or edge view of the material shown in FIG. 3; and

FIG. 5 is a fragmentary enlarged sectional view taken generally along line 5—5 of FIG. 3; and FIG. 6 represents a continuous bundle being drawn from a spool and randomly wound upon itself into disc-like form.

DESCRIPTION OF THE PREFERRED EMBODIMENT

In referring to the drawings, the reference numeral 10 indicates an annularly shaped disc-like friction material such as a clutch facing. The invention herein, while primarily relating to a clutch facing, has use as a friction material such as in disc brakes.

The clutch facing material defined herein is formed by wrapping continuous bundle 12 of generally parallel continuous ECK glass filaments spirally or randomly upon themselves to a disc-like preform and cured under elevated temperature and pressure. Continuous bundle 12 and the process by which it is prepared is fully disclosed in copending U.S. Pat. application Ser. No. 156,267 filed concurrently herewith. Briefly, that disclosure relates to collection into a continuous bundle numerous continuous glass filaments having diameters in the range of 12, to 14 microns. At one stage of processing they are impregnated with a cement composition. Thereafter they are partially dried and helically wrapped by filament means 16, such as brass wires, to hold the bundle together throughout its continuous length. It has been found that about 200 to 800 continuous K filaments can first be collected parallel to each other to define a strand. Then some 10 to 120 strands are further collected parallel to each other to define a roving. From 6 to 8 rovings are brought together parallel to each other after having been impregnated with cement and retained in a bundle by having a plurality of brass wires helically applied around their collected periphery.

The following cement composition was used to impregnate glass rovings: Rubber - 30–40 percent; Accelerate and Curing Agents, such as DOTG - 20–30 percent; Resin - 15–30 percent; and Filler - 20–30 percent. After the continuous filaments, whether in strand or roving form, are impregnated with cement, they are at least partially dried by exposure to steam or air to carry away the volatile hydrocarbons.

Continuous bundle 12, after being helically wrapped, is stored on spools or drums in lengths of several hundred to over 1000 feet for subsequent use. FIG. 2 illustrates schematically the process by which continuous bundle 12 is supplied from a spool 18 and spirally wound onto a revolving mandrel mold 20. This preform comprises a pair of plates 22 mounted on a rotatable shaft 24. The plates are axially spaced apart a selective distance equal to the desired thickness of the disc-like preform. Continuous bundle 12 is started around shaft 24 and slowly spirally wound in spiral where the length keeps building up on itself in ever increasing radii. Alternatively, the bundles may be applied by random winding wherein the bundles are constantly varying in the instantaneous radius at which they are being wound, as illustrated in FIG. 6.

The uncured spirally or randomly wound disc-like preform material is removed from mandrel 20. It maintains itself in a disc-like form by the friction between adjacent and overlapping bundle portions resulting from the winding operation. The inherent tackiness of the uncured cement composition also helps to hold the bundle in position. The uncured preform is then placed between flat platens under pressure in the range of 2000 to 2500 psi and cured at a temperature of from 320° to 340°F for 4 minutes. This initial cure hardens resins to a nonflow condition. Thereafter, the partially cured and densified preforms are removed and subjected to a post bake for completing the polymerization of the resins. The post bake comprises further curing under reduced pressure for about 6 hours at 350°F and 2 hours at 400°F. Upon completion of this post cure, the disc is ready to have flashing removed and be ground to the proper thickness. The finished facings are provided with rivet holes 14 having counterbores for reception of attaching rivets for securing the facings to a clutch plate or brake mounting, not shown.

Bundle 12 in the state shown in FIGS. 1, 2 and 6, impregnated with cement and wrapped with brass wires, comprises by weight ECK glass filaments in the range of 45 to 50 percent; cement in the range of 47–51 percent; and brass wire from 3–4 percent. As indicated, volatile hydrocarbons have been expelled from the cement prior to having helical wrappings of brass wire applied therearound. In such a state the continuous bundle is bendable and pliable so that it can be easily wound upon mandrel 20. The parallel glass filaments in the bundle are adapted to follow the desired contour and be wound over each other to generally fill all the spaces in the preform 20. The brass filament windings, since they extend around the outer periphery of the glass filament in bundle 12, are exposed to either face of the friction material. Each filament that is exposed to the surface also extends deep within the facing material since it encircles the bundle. They serve to hold the bundle and transmit heat. FIG. 5, which is an enlarged sectional view taken generally along line 5– 5 of FIG. 3, shows the bundles made up of 6 to 8 rovings which have been built up spirally one on another. The individual filaments continue to lie generally parallel to each other as they did in the roving or strand stage. As the bundle is spirally or randomly wound to define the body of the preform, the fibers are oriented to lie generally arcuately at a general radius from the center. The wear or friction surface of the clutch facing includes glass filaments with their sides generally present for frictional contact with a flywheel.

Continuous glass fibers, with sides exposed to friction contact, provide a clutch facing having equal to superior performance when compared to asbestos fibers, and a marked superiority in spin strength. A number of tests have been run on clutch facings of identical size and the results of these tests are tabulated as follows:

HOT SPIN STRENGTH (RPM) (1)

| Astestos (2) | Glass (3) |
|---|---|
| 8,558 '4) | 12,450 '4) |

| | |
|---|---|
| 8,442 | 13,283 |
| 7,500 | 12,667 |
| 8,550 | 11,817 |
| 7,567 | 12,867 |
| 9,350 | 12,100 |
| 8,417 | 11,933 |
| 9,033 | 11,567 |
| 8,717 | 12,267 |
| 9,617 | 12,033 |
| 8,283 | 11,550 |
| 9,717 | 12,500 |
| 9,183 | 12,967 |
| 10,333 | 12,750 |
| 9,783 | 13,366 |
| 10,167 | 13,000 |
| 9,950 | 13,275 |
| 9,066 | 13,300 |
| 8,933 | 13,033 |
| 8,650 | 13,250 |
| 9,258 | 12,614 Average |
| 8,280 | |
| 9,750 | |
| 10,383 | |
| 10,234 | |
| 9,069 Average | |

1. 500°F; size — 10.4 inches ×6.5 inches × 0.0135 inches thick.
2. Short length asbestos fibers intertwisted with brass wire.
3. Glass fibers in continuous bundles helically wrapped with brass wire.
4. Each figure represents average of six specimens.

It may be desired to compare the above tests with the tabular results presented in Bentz, U.S. Pat. Nos. 3,520,390 and 3,526,306.

It will be seen that substantial burst strength is provided by clutch facings formed by spirally wrapping continuous glass filaments upon themselves in the manner disclosed and claimed herein. Clutch facings using glass fibers have equal or better wear, face and torque transmittal characteristics to define a commercially superior friction material.

It will be understood that various changes may be made without departing from the spirit of the invention which is defined in the following claims.

We claim:

1. A friction facing consisting essentially of:
an annular flat body formed of a generally spirally wound continuous bundle of continuous longitudinally coextensive generally parallel glass fibers, said bundle impregnated with a heat curable cement composition,
filament means helically encircling portions of the periphery of the continuous bundle substantially throughout its length for retaining the glass fibers.

2. The invention according to claim 1 wherein the filament means is heat conductive.

3. The invention according to claim 2 wherein the filament means is metallic.

4. The invention according to claim 3 wherein the filament means is nonferrous.

5. The invention according to claim 4 wherein the filament means is brass wire.

6. A friction facing consisting essentially of:
an annular disc-like body formed of a spirally wound continuous bundle,
said bundle comprising numerous longitudinally coextensive generally parallel continuous glass fibers impregnated with a heat curable cement and having heat conductive metallic filament means helically applied about the bundle,
said filament means including portions lying adjacent a friction engaging surface of the facing and also including portions running to deep within the facing body for conducting frictional heat thereinto for dissipation.

7. The invention according to claim 6 wherein the filament means is brass wire.

8. A clutch facing consisting essentially of:
a disc-like body formed of a continuous bundle of numerous longitudinally coextensive generally parallel continuous glass fibers spirally wound upon itself in the plane of the body,
said bundle of glass fibers being impregnated with a heat curable cement,
said bundle throughout its spiral arrangement having heat conductive filament means helically disposed thereabout,
said helically disposed filament means having portions adapted for exposure to a friction face for absorbing frictional heat and being continuous with portions extending deep into the body for dissipation of heat thereinto.

9. The invention according to claim 8 wherein the heat conductive filament is brass.

10. A friction facing consisting essentially of:
an annular flat body formed of a generally randomly wound continuous bundle of continuous longitudinally coextensive generally parallel glass fibers,
said bundle impregnated with a heat curable cement composition,
filament means helically encircling portions of the periphery of the continuous bundle substantially throughout its length for retaining the glass fibers.

11. The invention according to claim 10 wherein the filament means is heat conductive.

12. The invention according to claim 11 wherein the filament means is metallic.

13. The invention according to claim 12 wherein the filament means is nonferrous.

14. The invention according to claim 13 wherein the filament means is brass wire.

15. A friction facing consisting essentially of:
an annular disc-like body formed of a randomly wound continuous bundle,
said bundle comprising numerous longitudinally coextensive generally parallel continuous glass fibers impregnated with a heat curable cement and having heat conductive metallic filament means helically applied about the bundle,
said filament means including portions lying adjacent a friction engaging surface of the facing and also including portions running to deep within the facing body for conducting frictional heat thereinto for dissipation.

16. The invention according to claim 15 wherein the filament means is brass wire.

17. A clutch facing consisting essentially of:
a disc-like body formed of a continuous bundle of numerous longitudinally coextensive generally parallel continuous glass fibers randomly wound upon itself in the plane of the body,
said bundle of glass fibers being impregnated with a heat curable cement,
said bundle throughout its random arrangement having heat conductive filament means helically disposed thereabout,
said helically disposed filament means having portions adapted for exposure to a friction face for absorbing frictional heat and being continuous with portions extending deep into the body for dissipation of heat thereinto.

18. The invention according to claim 17 wherein the heat conductive filament is brass.

* * * * *

PO-1050
(5/69)

UNITED STATES PATENT OFFICE
CERTIFICATE OF CORRECTION

Patent No. 3,743,069      Dated July 3, 1973

Inventor(s) Irvin Barnett and Walter B. Peters

It is certified that error appears in the above-identified patent and that said Letters Patent are hereby corrected as shown below:

Column 1, line 29, after "facings" delete "." and insert --,--;
Column 5, line 18, "0.0135" should be --.135--.

Signed and sealed this 26th day of March 1974.

(SEAL)
Attest:

EDWARD M. FLETCHER, JR.
Attesting Officer

C. MARSHALL DANN
Commissioner of Patents